US006279215B1

(12) United States Patent
Nomoto

(10) Patent No.: US 6,279,215 B1
(45) Date of Patent: Aug. 28, 2001

(54) AUTOMATIC WIRE CUTTING AND TERMINATING APPARATUS

(75) Inventor: Yoshiaki Nomoto, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/414,963

(22) Filed: Oct. 12, 1999

(30) Foreign Application Priority Data

Oct. 13, 1998 (JP) ................................................ 10-291033

(51) Int. Cl.[7] ............................ B23P 23/00; B23P 19/00; H01R 43/05; H01R 43/052

(52) U.S. Cl. ........................... 29/33 M; 29/564.4; 29/748

(58) Field of Search ............................... 29/33 M, 564.4, 29/748

(56) References Cited

U.S. PATENT DOCUMENTS 2,571,078 * 10/1951 Vollmer .................................... 140/1
3,114,828 * 12/1963 Gannoe .............................. 29/33 M
3,753,280 * 8/1973 Blakeney et al. ................... 29/564.4
3,897,617 * 8/1975 Ackerman et al. ................. 29/564.4
4,084,310 * 4/1978 Dragisic ............................. 29/564.4
4,506,566 3/1985 Schmid .
4,517,718 * 5/1985 Johnson, Jr. ........................ 29/33 M
4,615,100 * 10/1986 Reinertz ............................. 29/564.4
4,862,927 * 9/1989 Dorman et al. ....................... 29/56.6
4,993,147 * 2/1991 Carpenter et al. .................. 29/564.4
5,168,611 12/1992 Hornung .
5,235,735 * 8/1993 Koch .................................. 29/564.4
5,253,399 * 10/1993 Gloe et al. .......................... 29/33 M
5,440,804 * 8/1995 Tamura ................................. 29/825
5,490,316 * 2/1996 Kimoto ............................... 29/564.4
5,575,060 * 11/1996 Ohta et al. .......................... 29/33 M
5,655,293 * 8/1997 Celoudoux et al. ................ 29/33 M
5,784,770 * 7/1998 Long, Jr. et al. ................... 29/564.4
5,933,932 * 8/1999 Watanabe et al. .................. 29/33 M

* cited by examiner

*Primary Examiner*—A. L. Wellington
*Assistant Examiner*—Erica E Cadugan
(74) *Attorney, Agent, or Firm*—Finnegan, Henderson, Farabow, Garret & Dunner, L.L.P.

(57) ABSTRACT

In an automatic wire cutting and terminating apparatus having a clamping mechanism (60) that grasps a wire (W) when it is returned from a terminal crimper to a cutting and stripping unit, the clamping mechanism (60) is formed by a first support (63), and upper clamp (64) provided on the first support (63), a second support (65) provided so as to be slidable up and down with respect to the first support (63), a lower clamp (66) provided on the second support (65), and drive source (69) having a cam follower (67) that engages with cams (63*c*) and (65*c*) provided on each of the supports (63) and (65), wherein movement of the cam follower (67) by the drive source (69) causes the upper and lower clamps (64) and (66), via the supports (63) and (65) and the cams (63*c*), to move together or apart.

3 Claims, 10 Drawing Sheets

AUTOMATIC WIRE CUTTING AND TERMINATING APPARATUS

BACKGROUND OF THE INVENTION

1. Field of the Invention

The present invention relates to an automatic wire cutting and terminating apparatus of a type that cuts an insulated electric wire, and strips a length of insulation from a respective cut end of the electric wire or a cut piece thereof, terminating the stripped end by applying a crimp-on (or solder-less) terminal for use, for example in a wire harness of a vehicular electrical system.

2. Description of the Related Art

As such a type of automatic wire cutting and terminating apparatus, there has been disclosed in Japanese Patent Application Laid-Open Publication No. 8-102354 a both-end terminating apparatus for insulated electric wires.

FIG. 9 is a plan of the both-end terminating apparatus, and FIG. 10, a front view of an essential part of the apparatus.

As illustrated in FIG. 9, a supply station 3 has a large number of wire-feeding tubes 3*a*, on a base 2. The supply station 3 is provided so that it can freely move in the direction indicated by the arrow e. A rotating arm 4 is provided on the ejection side of the supply station 3, this arm having a clamping means (not shown) for clamping an electrical wire W that is supplied from the supply station 3. The rotating arm 4 can freely swing (rotate) left and right with respect to the base 2, about the axis 5. As a result of the swinging of the rotating arm 4, a head 4*a* of the arm 4 can be positioned at a reference position H, a maximum-swing work position J, which is at the maximum angle from the reference position H, and at an intermediate work position I, which is between the above-noted reference and maximum-angle positions. The head 4*a* of the rotating arm 4 is configured so as to be opposite the wire cutter 6A when in the reference position H, opposite the wire insulation stripper 6B when in the intermediate position I, and opposite the terminal-crimping part when at the maximum-angle work position J. As shown in FIGS. 9 and 10, a first transporter 7 is provided on the base 2, this first transporter 7 being freely movable in the directions indicated by the arrows m and n in FIG. 9. Four clamps, 7*a* through 7*d* are provided at a uniform mutual spacing on the first transporter 7, the clamp 7*a* moving between the reference position H and the first work position K, the clamp 7*b* moving between the first work position K and a second work position L, the clamp 7*c* moving between the second work position K and a third work position M, and the clamp 7*d* moving between the third work position M and a fourth work position N. When a moving cylinder 7S is moved to the reference position H along a cylinder rod 7R, the first clamp 7*a* of the first transporter 7 is brought into opposition with the wire cutter 6A.

A second transporter 8 is also provided at the first work position K of the first transporter 7, this being provided so as to enable free movement thereof in the direction of the arrow p. The second transporter 8 has a clamp 8*a*, which by moving a clamped wire W in the direction of the arrow p, enables the movement of the wire W to a position opposite an insulation-stripping part 6D. A third transporter 9 is provided at the second work position L of the first transporter 7, this being freely movable in the direction of the arrow q. The third transporter 9 has a clamp 9*a* which moves in the direction of the arrow q, so as to move a clamped wire W to a position opposite a terminal-crimping part 6E.

A clamp 6F is provided at the third work position M and a fourth clamp 7*d* is provided at the fourth work position N of the first transporter 7.

In the above-described mechanism, a wire W is supplied by the supply station 3 to the rotating arm 4, the supplied wire W being clamped by a clamping means (not shown), and the end of the wire W being set in a position so that it protrudes from the head 4*a* of the rotating arm 4. Next, the wire W that protrudes from the head 4*a* of the rotating arm 4 is cut by the wire cutter 6A, and the rotating arm 4 rotates from the reference position H to the intermediate work position 1. Next, the insulation covering of the cut end of the wire W is stripped by the wire insulation stripper 6B, and the rotating arm rotates from the intermediate work position I to the maximum-angle work position J. Next, a terminal is crimped onto the conductor of the wire W by the terminal crimper 6C, at which point the rotating arm 4 returns from the maximum-angle work position J to the reference position H, thereby completing the process of terminating one end of the wire W.

When the rotating arm 4 returns to the reference position H, the first transporter 7 moves in the direction of the arrow m, the first clamp 7*a* being positioned at the reference position H, and a prescribed amount of the wire W being pulled out from the head 4*a* of the rotating arm 4, This extended wire W is clamped by the first clamp 7*a* of the first transporter 7, the first clamp 7 moving in the direction of arrow n, so that the first clamp 7*a* is moved to the first work position K. Next, the clamp 8*a* of the second transporter 8 re-clamps the wire W and moves in the direction of the arrow p, so that the wire W is moved to the region of the insulation stripper 6D.

Next, the insulation stripper 6D strips the insulation covering from the other end of the wire W, after which the second transporter 8 returns to its original position. Next, the second clamp 7*b* of the first transporter 7 moves to the first work position K, and the second clamp 7*b* re-clamps the wire W. Next, the first transporter 7 moves in the direction of the arrow n, so that the second clamp 7*b* is moves to the second work position L. Next, the clamp 9*a* of the third transporter 9 re-clamps the wire W, and moves in the direction of the arrow q, so that the wire W is moved to the region of the terminal crimper 6E.

Next, the terminal crimper 6E crimps a terminal on to the other end of the wire W, after which the third transporter 9 returns to its original position. Next, the third clamp 7*c* of the first transporter 7 moves to the second work position, and re-clamps the wire W. Next, the first transporter 7 moves in the direction of the arrow n, so that the third clamp 7*c* moves to the third work position M. Next, the clamp 6F re-clamps the wire W and the first transporter 7 moves so as to move the wire W to the fourth work position N, the wire ejector 6G ejecting the wire W, which completes the process of terminating the other end of the wire W.

The configuration of the above-described double-end crimping apparatus 1 is such that, when a terminal is crimped onto the first end of the wire W and the head 4*a* of the rotating arm 4 returns from the maximum-angle work position J to the reference position H, the first clamp 7*a* of the first transporter 7 moving to the reference position H (the position opposite to the wire cutter 6A as shown in FIG. 9), a prescribed amount of the wire W is pulled out from the head 4*a* of the rotating arm 4, this extended part of the wire W being clamped by the first clamp 7*a* and transported to the first work position (the position which at which the other end of the wire W is terminated). However, when the wire W is pulled out from the head 4*a* of the rotating arm 4 and clamped by the first clamp 7*a* of the transporter 7, if the head 4*a* of the rotating arm 4 is returned to the reference position from the maximum-angle work position J and the first clamp 7*a* of the first transporter 7 simultaneously grabs the first end of the wire W in order to increase production speed, there is a tendency for shaking of the wire W to prevent its being securely grabbed, this resulting in the wire W being missed in the grabbing process, resulting in failed products.

Accordingly, it is an object of the present invention to solve the above-noted drawbacks in the related art, by providing an automatic wire cutting and terminating apparatus wherein, the wire can be securely grabbed simultaneously the return of a wire guide of a wire transporter from a terminal crimper to a cutting and stripping unit, thereby enabling the elimination of failed products and the reduction of the production time.

SUMMARY OF THE INVENTION

To achieve the above-noted object, a first aspect of the present invention provides an automatic wire cutting and terminating apparatus comprising a first terminating section for crimping a terminal on a stripped end of a length of insulated electric wire set in a first termination position, a wire transporter for transporting the length of insulated electric wire with the terminal crimped thereon from the first termination position in a first direction to a second termination position, a second terminating section for terminating another end of the length of insulated electric wire received at the second termination position, and a clamp mechanism for clamping part of the length of insulated electric wire at the second termination position, the clamp mechanism comprising a pair of clamping members movable relative to each other in a second direction crossing the first direction for positioning the part of the length of insulated electric wire.

According to the aspect of the invention, the length of insulated electric wire can be held in position in an ensured and facilitated manner.

BRIEF DESCRIPTION OF THE DRAWINGS

The above and further objects and novel features of the present invention will more fully from the following detailed description when the same is read in conjunction with the accompanying drawings, in which.

DETAILED DESCRIPTION OF THE PREFERRED EMBODIMENTS

Figure 1:
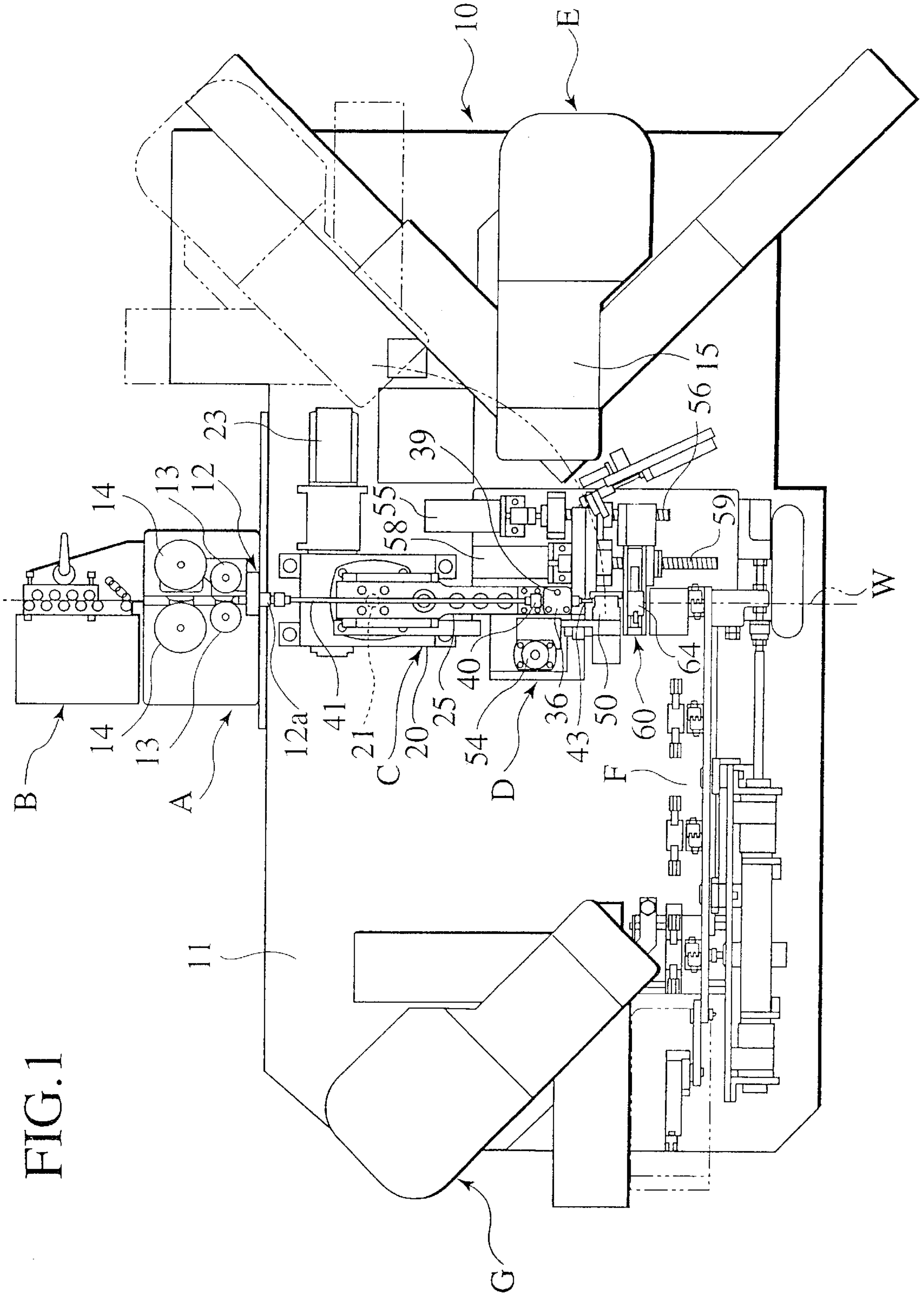
FIG. 1 is an overall plan view of an embodiment of an automatic wire cutting and terminating apparatus according to the present invention.

There will be detailed below the preferred embodiments of the present invention with reference to the accompanying drawings. Like members are designated by like reference characters.

FIG. 1 shows in plan an entirety of an automatic wire cutting and terminating apparatus 10 according to an embodiment of the present invention. The wire cutting and terminating apparatus 10 has a base 11 of which a front side leftwardly and rightwardly extends at the bottom side of the figure and a rear side extends at the top side of the figure. The apparatus 10 comprises a wire-measuring unit A located at the rear edge at substantially the center of the base 11 for measuring out the wire W by a prescribed length, a wire correction unit B mounted to the rear end of the wire measuring unit a for correcting bends and kinks in the wire W and feeding the wire W to the wire measuring unit A, a wire rotating unit C mounted at the rear side of the approximate center on the base 11 for cutting the wire W, a cutting and stripping unit D mounted substantially in the center of the base 11 for cutting the wire W and stripping the insulation covering from the cut end thereof, a terminal-crimping unit mounted on one side of the base 11 for crimping a terminal T onto the stripped end Wa of the wire W that was cut and stripped by the cutting and stripping unit D so as to make a connection thereto, a wire transporting unit F mounted in the approximate center of the other side on the base 11 for transporting the cut wire W after a terminal T is crimped onto the end thereof, and a terminal-crimping unit G mounted to the other side of the base 11 for making a crimp-on connection to the other end Wb of the wire W transported by the wire transporting unit F.

Figure 2:
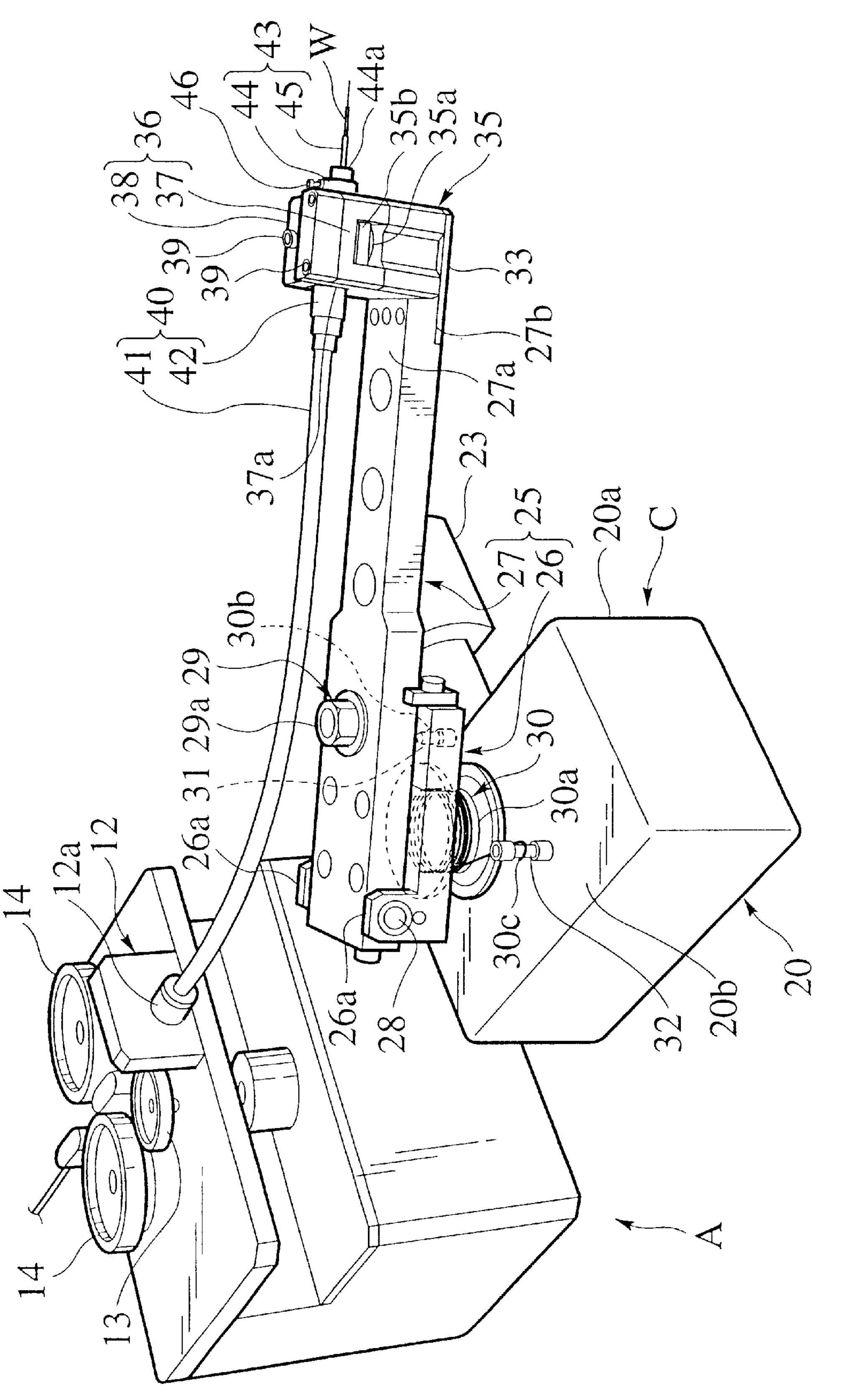
FIG. 2 is a perspective view of the wire rotating unit of the automatic wire cutting and terminating apparatus of FIG. 1.
Figure 4:
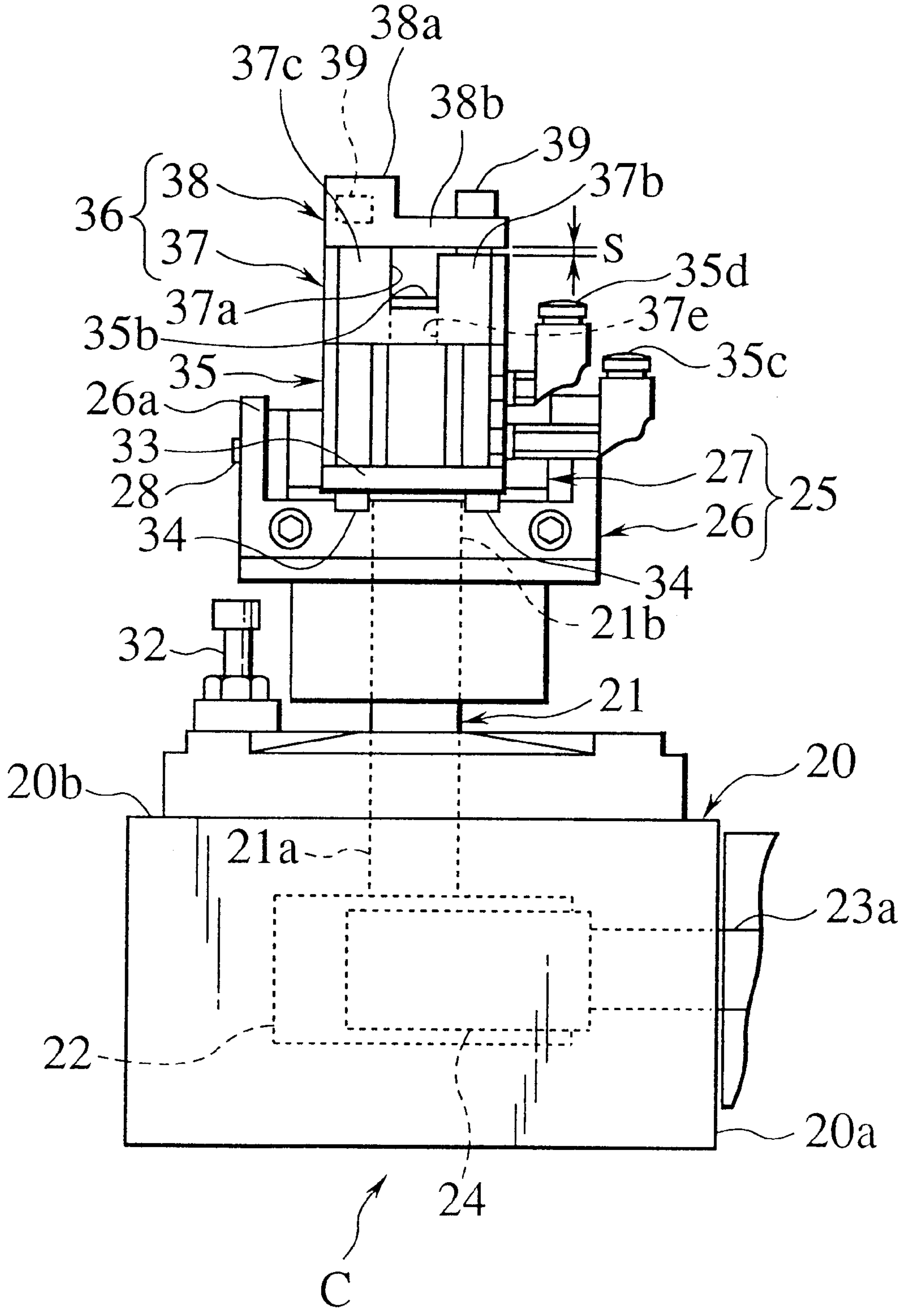
FIG. 4 is a partial front view of the wire rotating unit of FIG. 2.

As shown in FIG. 2 and FIG. 4, the wire rotating unit C of the automatic wire cutting and terminating apparatus 10 has a speed reduction case 20 mounted to the base 11 and rotatably supporting at its center a rotating shaft 21, a servomotor (drive source) 23 mounted to one wall 20*a* of the speed reduction case 20 which has at the end of its rotating shaft 23*a* a worm gear 24, which meshes with a worm wheel 22 that is fixed to the bottom end 21*a* of the rotating shaft 21, and a wire transporter 25 fixed to an upper edge 21*b* of the rotating shaft 21 that protrudes from the center of the speed reduction case 20 to the outside thereof, this wire transporter 25 reciprocally moving the wire W between the cutting and stripping unit D and the terminal-crimping unit E for one end of the wire W.

The wire transporter 25 is formed by an arm holder (base end) 26, having a squared-cup shape when viewed from the front and fixed to the upper end 21*b* of the rotating shaft 21, supported via the walls 26*a* extending on both sides of the base end of the arm holder 26 so as to swing freely to the left and right. A bolt 29 is screwed into the front side of the arm holder 26. The rotating arm 27 passes through the shank of the bolt 29 (not shown), a compression coil spring (resilient impelling member, not shown) inserted around the shank acting to constantly impel the upper end 27*a* of the rotating arm 27 upward. The action of the compression coil spring in impelling the rotating arm 27 upward is restricted by the head 29*a* of the bolt 29.

Play in the arm holder 26 at various stopping positions, these positions being initial position (reference position) P of the wire transporter 25, the intermediate work position Q for soldering or the like, and the terminal crimping position R, is prevented by the torsion coil spring 30. This is, the winding part 30*a* of the torsion coil spring 30 is wound around the rotating shaft 21, and one end 30*b* of the torsion coil spring 30 is held in place by a pin 31 protruding at the lower surface of the arm holder 26, the other end 30*c* of the torsion coil spring 30 being held in place by a pin 32 protruding from the top cover 20*b* of the speed reduction case 20.

Figure 5:
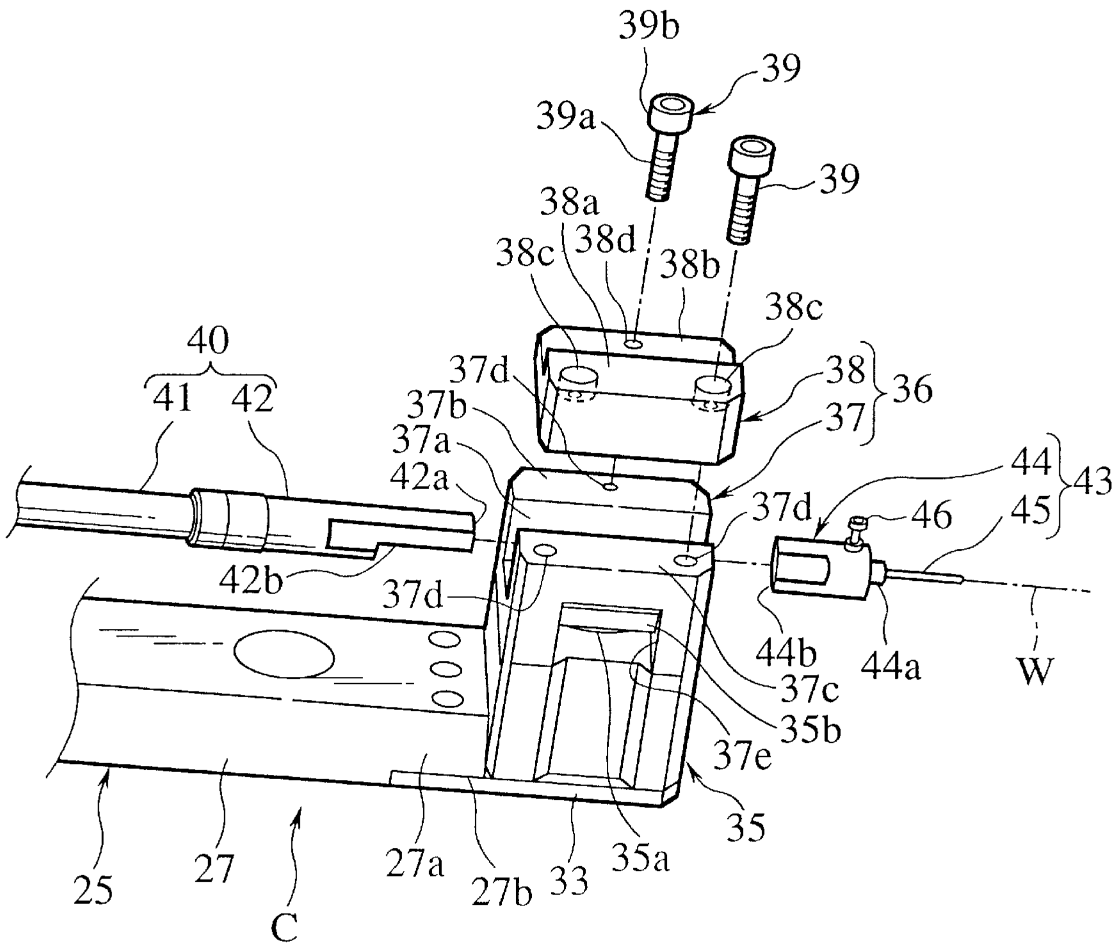
FIG. 5 is a perspective view of the main part of the wire rotating unit of FIG. 4.

As shown in FIG. 2 and FIG. 5, an air cylinder (drive cylinder) 35 and a holding member 37 of holder 36 are fixed to cutout 27*b* at the lower side of the end 27*a* of the rotating arm 27, via a linking plate 33 and a plurality of bolts 34 (FIG. 4). This holder 36 has a hollow 37*a* that extends in the wire feeding direction, and that houses the far end of a guide tube 40 and the base end side 44*b* of a nozzle 43, to be described below, and a cover 38, which is mounted using three bolts (tightening means) 39 so that it covers the hollow 37*a* between the walls 37*b* and 37*c* on either side of the holding member 37. The height of one of the walls 37*b* of the holding member 37 is formed so as to be lower than the height of the other side wall 37*c*. By doing this, as shown in FIG. 4, a space S is formed between the lower side wall 37*b* and the bottom surface of the cover 38, making it possible to removably hold a plurality of types of guide tube 40 ends and nozzle 43 base ends having different diameters between the hollow 37*a* and the cover 38, using a single bolt 39.

On the center part of the top surface of the side wall 37*b* and both sides of the top surface of the other side wall 37*c* are formed threaded holes 37*d*, into which the bolts 39 are screwed. On both sides of thicker part 38*a* of the cover 38 are formed through holes 38*c*, through which the shank 39*a* and head 39*b* of the bolts 39 pass, and in the center part of the thinner part 38*b* of the cover 38 is formed a through hole 38*d*, through which the shank 39*a* of a bolt 39 passes.

As shown in FIG. 2, the guide tube 40 through which the wire W is passed and which guides the wire W in the wire feeding direction is made up of a tube 41 of a soft, transparent synthetic resin, which extends from the cylinder part 12*a* of a bracket 12 of the wire measuring unit A, and a tube holder 42, which is substantially cylindrical and which communicates with the end of the tube 41. On the lower side of the end 42*a* of this tube holder 42 is formed a cutout 42*b* (see FIG. 5). A rectangular aperture 37*e* is formed in the center of the hollow 37*a* of the holding member 37 (at a position that is opposite the cutout 42*b* of the holder tube 42 when it is housed in the hollow 37*a*), and inside this aperture 37*e*, a pusher 35*b* which is integrally formed together with the top end of a piston rod 35*a* of the air cylinder 35 is can be driven forward and back. The wire W, while being measured out by a pair of measuring rollers 13 of the wire measuring unit A, it successively fed into the tube 41.

The nozzle (wire guide) 43 that communicates with the end 42*a* of the tube holder 42 is formed by a cylindrical metal nozzle body 44 that is substantially the same diameter as the tube holder 42, and a flexible tube 45, which is formed by a tightly wound coil spring or the like that is fixed, via a bolt 46, to the inside of the cylindrical protrusion 44*a* of the nozzle 44. The end 42*a* of the tube holder 42 of the guide tube 40 and the nozzle body 44 of the nozzle 43 communicate substantially at the center of the inside of the hollow 37*a*. The guide tube 40 and nozzle 43 are selected to suit the type and size of wire W.

As shown in FIG. 1 and FIG. 6, the cutting and stripping unit D has a pair of lower and upper moving members 50 that cut and strip the wire W of its insulation covering, and a clamping mechanism 60, which grabs one end of the wire W when it is being cut and stripped. A cutting blade 51 protrudes from the center of the opposing surfaces of the moving members 50, and on either side thereof a stripping blade 52 protrudes. A servomotor (not shown) turns a screw 54 so as to move the moving members 50 up and down so that they approach each other or moved away from each other, and a screw 56 that is turned by servomotor 55 imparts forward and reverse movement. The stage 53 onto which the clamping mechanism 60 is placed is movable forward and in reverse by a screw 56 that is turned by a servomotor 58.

Figure 7:
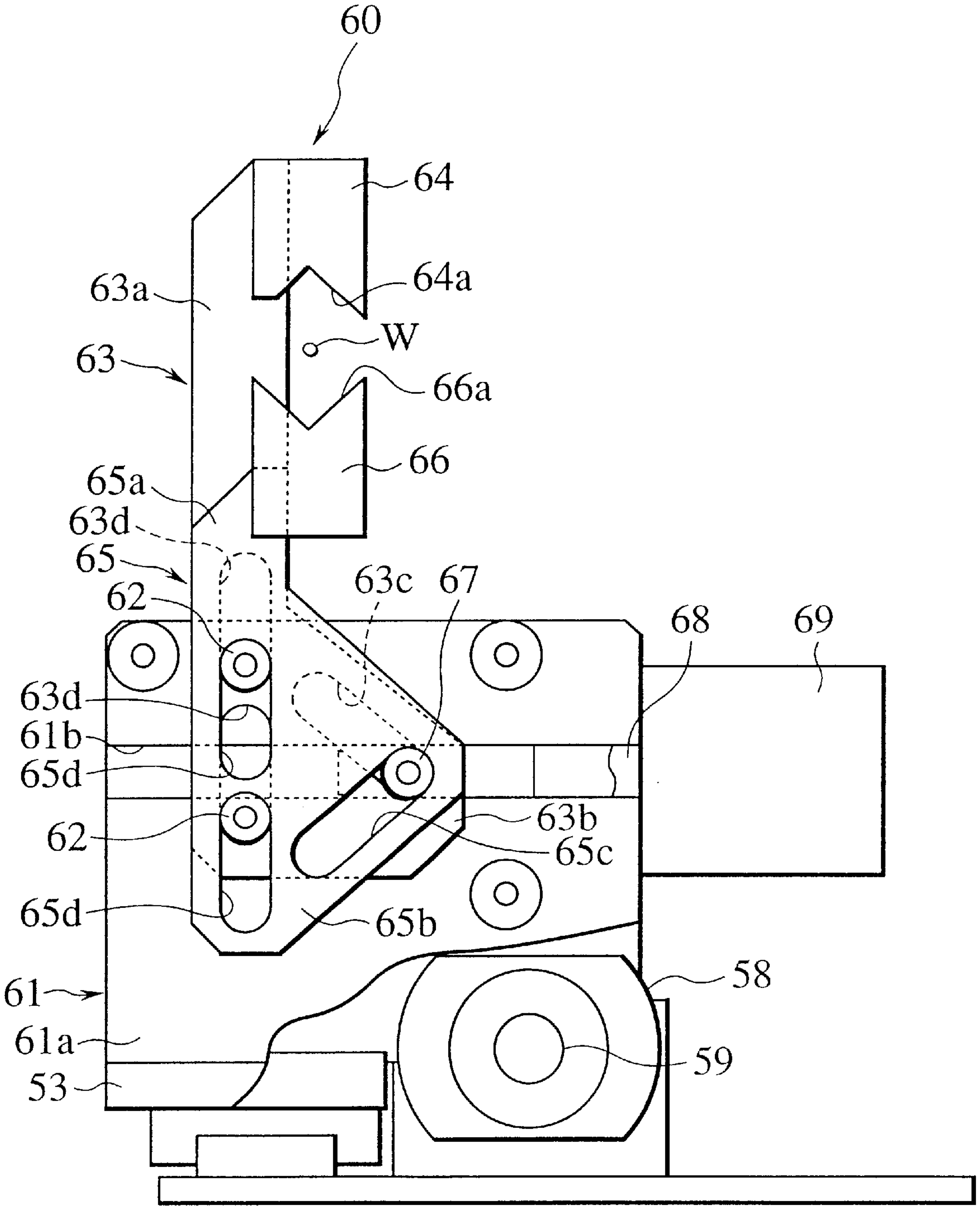
FIG. 7 is a front view showing the condition before the clamping mechanism of the automatic wire cutting and terminating apparatus of FIG. 1 clamps the wire.
Figure 8:
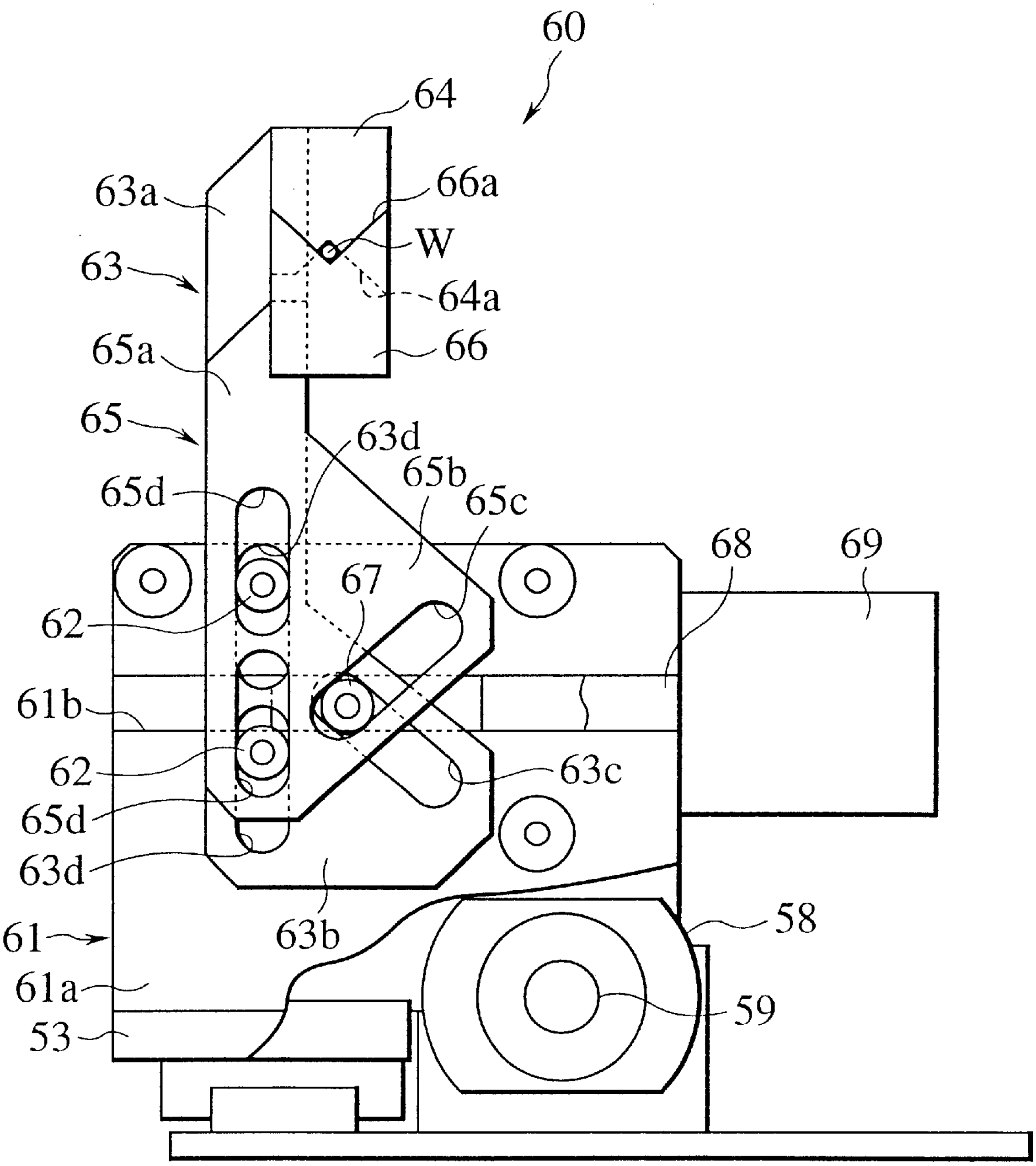
FIG. 8 is a front view showing the condition when the clamping mechanism of FIG. 7 clamps the wire.
Figure 9:
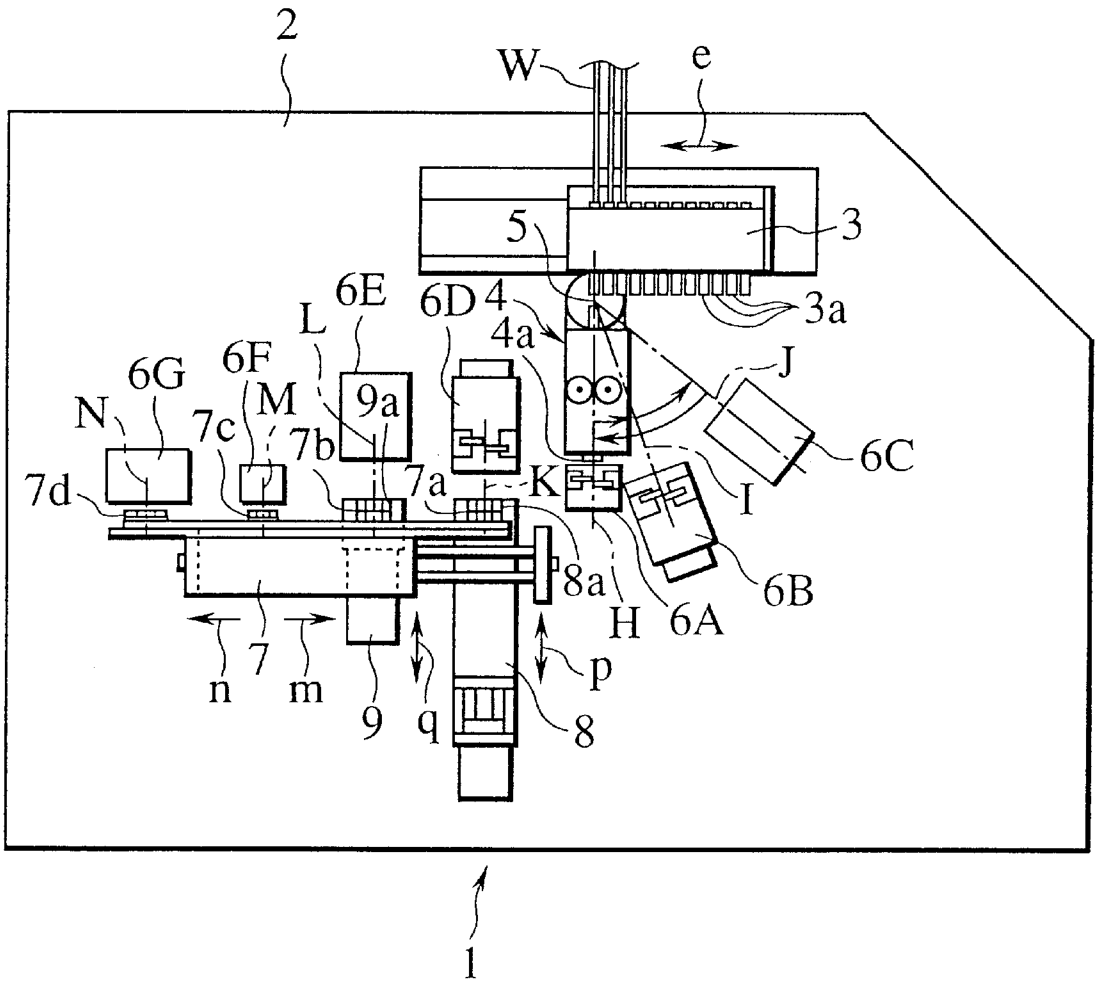
FIG.9 PRIOR ART
FIG. 9 is a simplified plan view showing a double-ended crimping apparatus in the related art.
Figure 10:
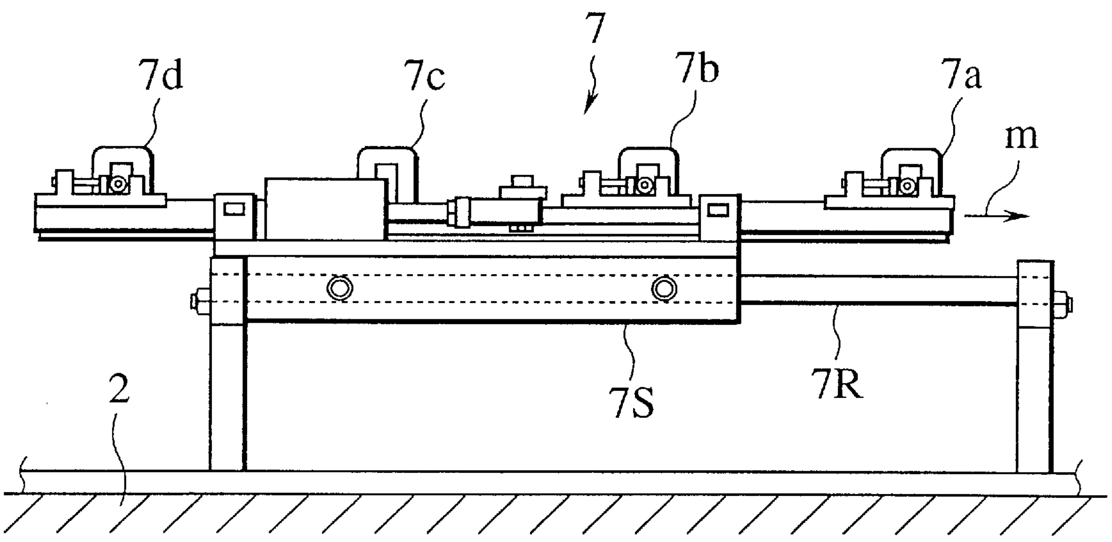
FIG. 10 PRIOR ART
FIG. 10 is a front view showing the first transporter of the double-ended crimping apparatus of FIG. 9.

As shown in FIGS. 7 and 8, the clamping mechanism 60 is formed by a first support 63, which is supported to the front surface (single surface) of a base 61 mounted to the stage 53, via a pair of bearings 62 to enable sliding upward and downward, this first support 63 serving also as a stopper for positioning a first end of the wire W, and upper clamp 64 that is fixed to the upper part 63*a* of the first support 63 and which grabs the wire W in the center of a downward-facing V surface 64*a*, a second support 65, which is supported by the support 63 via the above-noted pair of bearing 62 to enable sliding upward and downward, and which has a height that is lower than the support 63, a lower clamp 66 that is fixed to the top part 65*a* of the second support 65, and which grabs the wire W in the center part between the upward-facing V-shaped surface 66*a* and the downward-facing V-shaped surface 64*a* of the upper clamp, and an air cylinder (drive source) 69 that has a bearing (cam follower) 67 on a piston rod 68 that engages with the inclined cams 63*c* and 65*c* formed on the lower parts 63*b* and 65*b* of the supports 63 and 65, respectively.

The inclined cams 63*c* and 65*c* have grove holes with inclinations in opposite directions, a bearing 67 that serves as a cam follower that is rotatably supported at the end of the piston rod 68 of the air cylinder 69 being inserted and engaging in the inclined cams 63*c* and 65*c*. By means of the forward and reverse movement of this piston rod 68, the bearing 67 moves, the result being that the upper and lower clamps 64 and 66, via the inclined cams 63*c* and 65*c* of the supports 63 and 65, move up and down so as to come together or move apart. On each of the wide lower parts 63*b* and 65*b* of the supports 63 and 65 is formed a pair of vertically elongated holes 63*d* and 65*d*. The bearing 62, which are rotatably supported on the front surface 61*a* of the base 61, are inserted into and engage with the inside the vertically elongated hole pairs 63*d* and 65*d*. By doing this, the supports 63 and 65 slide in directions that bring them towards or away from each other. The piston rod 6, which is moved forward an in reverse by the air cylinder 69, is housed with a hollow 61*b* formed in the front surface 61*a* of the base 61, and bearing 67 protrudes at the front surface 61*a*.

Figure 3:
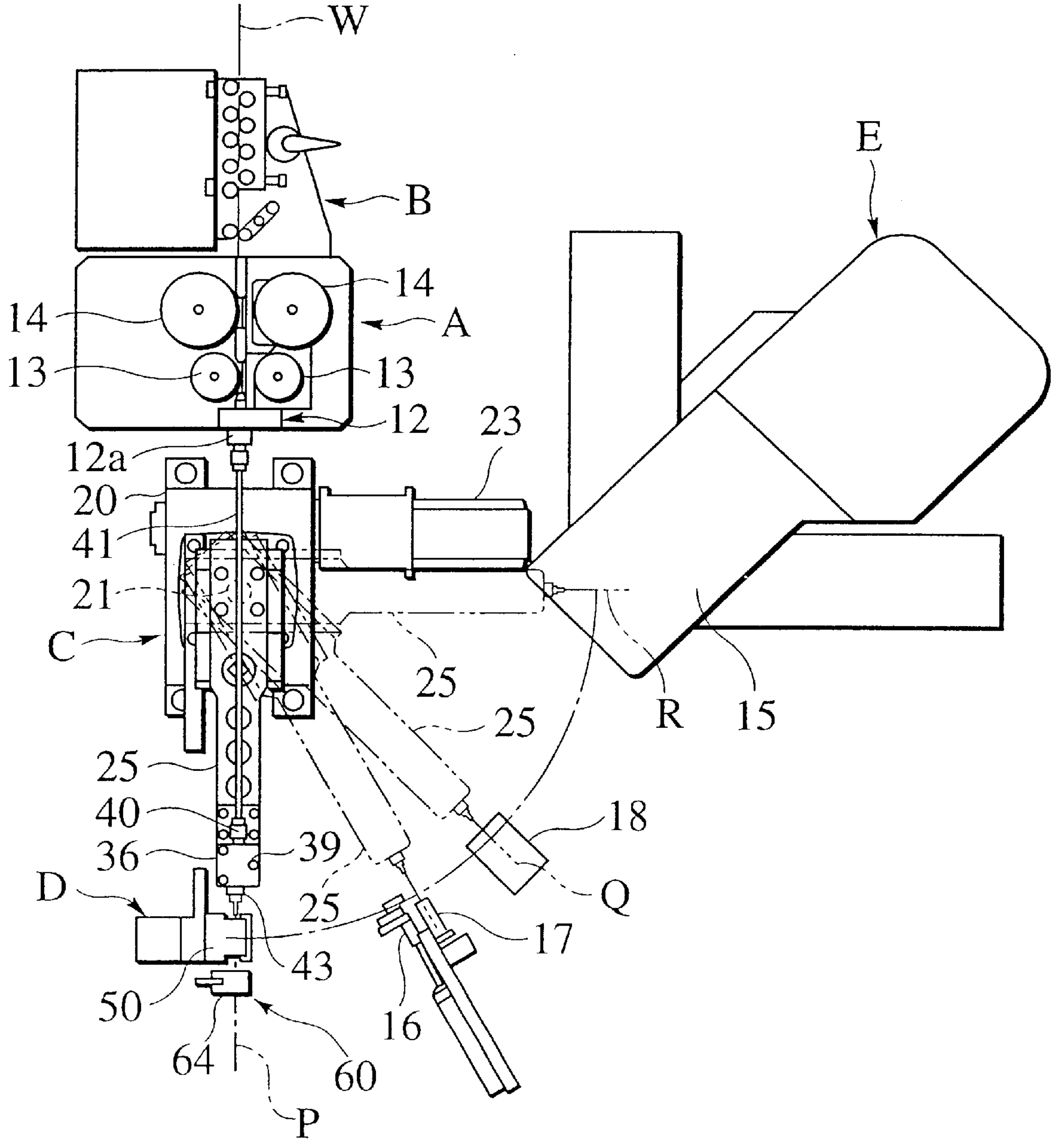
FIG. 3 is a partial plan view of the area surrounding the wire rotating unit of the automatic wire cutting and terminating apparatus of FIG. 1.

The reference numeral 15 in FIG. 3 denotes a terminal crimper of the terminal crimping unit E, 16 is stripping inspection unit, 17 is a terminal crimping inspection unit, and 18 is an intermediate work unit for soldering or the like. In FIG. 4, the reference numerals 35*c* and 35*d* denote the air supply ports for the air cylinder 35, by the switching of which the pusher 35*b* is moved upward and downward. A hexagonal hole is formed in the head of each of the bolts 34 and 39, a hexagonal wrench (not shown) or such tool being used to loosen these bolts.

According to the above-described embodiment of an automatic wire cutting and terminating apparatus of the present invention, at the initial position P of the wire transporter 25 shown in FIG. 3 (this being the reference position, which is opposite the cutting and stripping unit D), the wire W is fed into the tube 41 of the guide tube 40 of the transporter 25, via the pair of feed rollers 14 of the wire correction unit B and the wire measuring unit A, so that it is fed outside the end (flexible tube 45) of the nozzle 43. The condition in which the wire W is fed by a prescribed amount beyond the end of the nozzle 43 is held in place by the pusher 35*b* of the piston rod 35*a* of the air cylinder 35 at the lower end of the wire transporter 25.

Figure 6A:
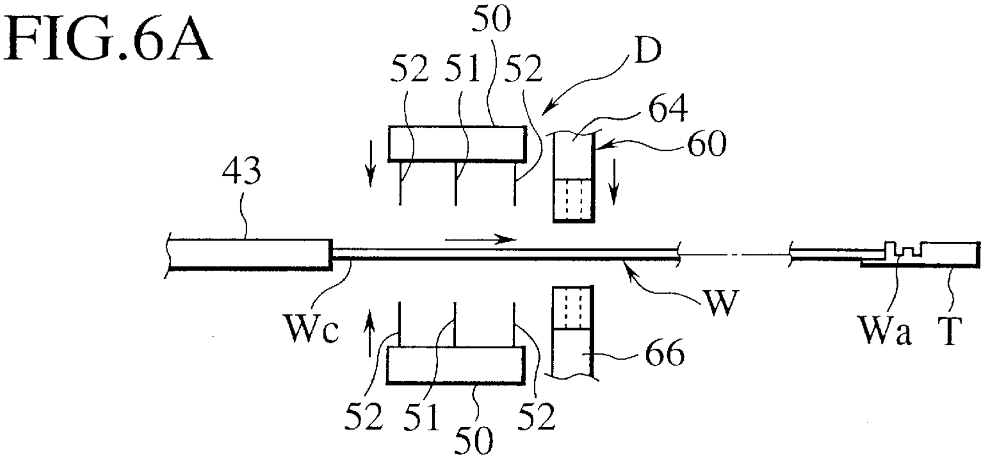
FIG. 6A is a drawing illustrating the condition before the wire is cut by the cutting and stripping unit of the automatic wire cutting and terminating apparatus of FIG. 1.
Figure 6B:
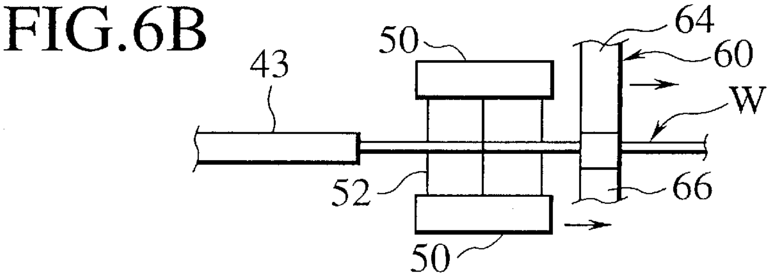
FIG. 6B illustrates the condition after this wire is cut.
Figure 6C:
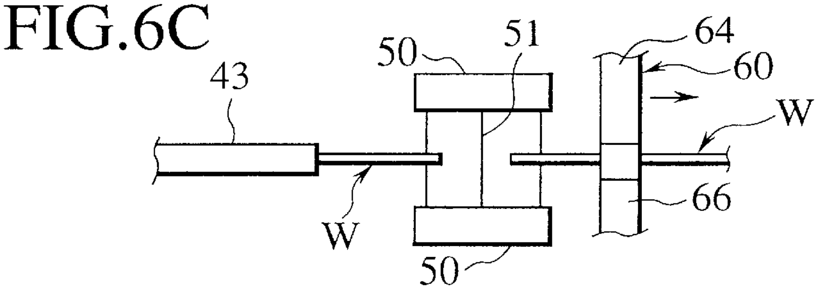
FIG. 6C illustrates the condition before the wire is stripped of its insulation covering.
Figure 6D:
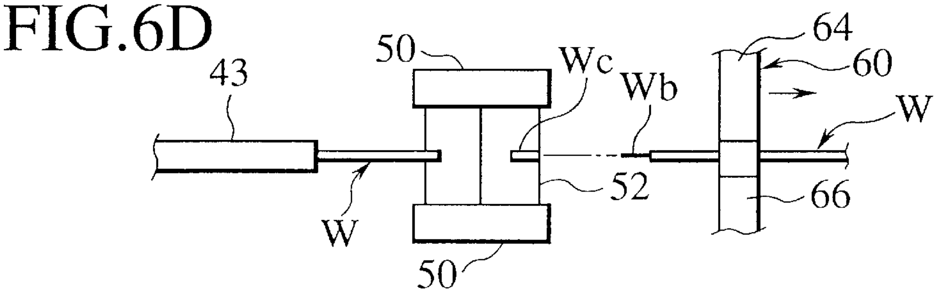
FIG. 6D illustrates the condition during the stripping of insulation from the wire.
Figure 6E:
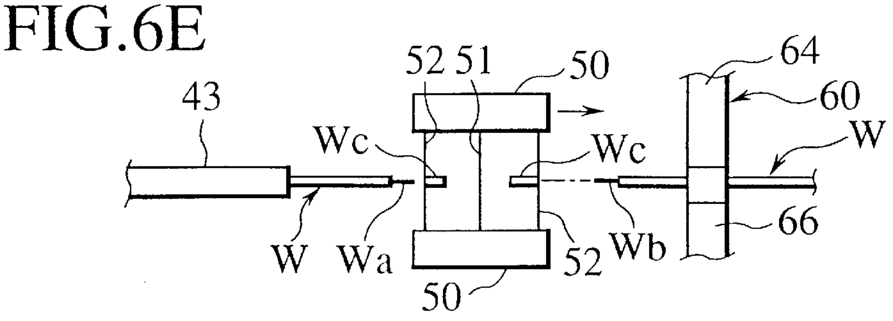
FIG. 6E illustrates the condition in which the insulation has been stripped therefrom.

As shown in FIG. 61, FIG. 6B, and FIG. 6C, the wire W, which is held in place at prescribed intervals by pusher 35*b* of the piston rod 35 *a* of the air cylinder 35 of at the lower end of the wire transporter and by the upper and lower supports 64 and 66 of the clamping mechanism, is cut by the pair of moving members 50 of the cutting and stripping unit D and the clamping mechanism 60 and, as shown in FIG. 6D and FIG. 6E, the insulation covering material Wc at each cut end of the wire W is stripped away.

Next, the rotating shaft 21 is turned in the counterclockwise direction by the action of the servomotor 23, the worm gear 24, and the worm wheel 22, so that the nozzle 43 side of the wire transporter 25 is turned, 45 degrees for example, to the terminal-crimping unit E for the first end of the wire, the nozzle 43 of the wire transporter 25 being stopped at the intermediate work position Q for soldering or the like. Next, at the intermediate work position Q, after performing work such as soldering at the covering material Wc at the first end Wa of the first wire W by means of an intermediate work unit, the nozzle 43 end of the wire transporter 25 is further turned, 45 degrees for example, the nozzle 43 of the wire transporter 25 being stopped at the terminal-crimping position R. Next, at this terminal-crimping position R, a terminal T is crimped onto the end Wa on the first end of the wire W.

Then, after crimping the terminal T onto the end Wa of the first end of a first wire W, the rotating arm 27 of the wire transporter 25 is rotated so as to return the nozzle 43 from the terminal-crimping unit E to the original reference position P, at which point the first end of the first wire W is fed out by a prescribed amount by the wire correction unit B and the pair of rollers 14 of the wire measuring unit A, this first end being cut by the cutting and stripping unit D and the insulation covering material Wc on the second end Wb being stripped away, the first wire W being transported via the wire transporting unit F to the terminal-crimping unit G for the other end, at which a terminal T is crimped onto the other end Wb of the first wire W. The above-noted steps are repeated in sequence so that terminal T are crimped onto both ends Wa and Wb of the wires W. enabling the continuous production of wires W of a prescribed length.

In the above-described manner, when rotating the rotating arm 27 of the wire transporter 25 from the terminal-crimping unit E to the cutting and stripping unit D, so that the nozzle 43 returns from the terminal crimping position R to the reference position P, that is, when feeding a wire W, terminal T having been crimped onto one end Wa of which, via pair of measuring roller 13 of the wire measuring unit A, from the end of the nozzle 43 of the wire transporter 25, between the separated upper and lower clamps 66 of the clamping mechanism at the reference position P, as shown in FIG. 7, because the upper part 63*a* of one of the supports 63 mounting to the upper clamp 64 serves as a stopper for the wire W, one end of the wire W can be grabbed precisely between the opposing V-shaped surfaces 64*a* and 66*a* of the upper and lower clamps 64 and 66 without waiting for the shaking of the end of the wire W to settle. By doing this, there is maximum prevention of bad product and stoppage of the apparatus, while and improvement is had in the production speed. When this is done, because the wire W does not travel beyond the end of the clamping mechanism 60, there is no damage incurred to the insulation covering material Wc of the wire W.

Additionally, by using inclined cams 63*c* and 65*c* as means of sliding the upper and lower clamps 64 and 66 upward and downward, by using a bearing 67 as a cam follower, and by using a bearing 62 in the vertically elongated hole pair 63*d* and 65*d* of the supports 63 and 65 that are mounted to the upper and lower clamps 64 and 66, it is possible to eliminate variation in the grabbing force of the upper and lower clamps 64 and 66, and to make the clamping mechanism 60 more compact. Additionally, by using the bearings 62 and 67 on sliding parts, because a moment generated at the supports 63 and 65 and the propulsion of the air cylinder 69 is received by the bearings 62 and 67, friction does not occur when the supports 63 and 65 slide. Also, even if gouging occurs, operation is smooth. Because of this, it is possible not only to reduce the loss in propulsion from the air cylinder, but also to smoothly slide the supports 63 and 65 up and down, so as to securely grasp the wire W by the upper and lower clamps 64 and 66.

Although the foregoing embodiment of the present invention was for the case in which the wire transporter is rotated 90 degrees from the reference position, a terminal being crimped onto an end thereof that has been stripped, the rotational position of the wire transporter at which a terminal is crimped onto the wire is not restricted to 90 degrees. It will be understood that this angle can be arbitrarily set to any rotational angle, including 45 degrees, for example. Additionally, it will be understood that the drive source of the clamping mechanism is not restricted to an air cylinder, and can be any other appropriate source of drive.

Generally an automatic wire cutting and terminating apparatus comprises wire cutter, a cutting and stripping unit, a terminal crimper, a wire transporter for transporting a wire to the wire cutter and to the terminal crimper, the wire transporter comprising a wire guide for guiding the wire in a wire feeding direction, and a clamping mechanism which grasps one end of the wire, which has been fed out from the wire guide. The wire has been cut and stripped of insulation by the cutting and stripping unit, and has been transported to the terminal crimper. The wire is terminated thereby with a crimp-on terminal by the terminal crimper, and then returned to the cutting and stripping unit. The clamping mechanism comprises a first support that serves to position the wire, an upper clamp that is provided on the first support, a second support that is provided so as to freely slide up and down with respect to the first support, a lower clamp provided on the second support, and a drive source comprising a cam follower that engages with cams that are provided on each of the first and second support. In the clamping mechanism the movement of the cam follower causes upper and lower cams, via the supports and cams, to move away from each other and toward each other.

In other words, in an automatic wire cutting and terminating apparatus according to the first aspect of the present invention, a wire guide that guides a wire in the wire feeding direction is provided in a wire transporter that transports a wire to a cutting and stripping unit and to a terminal crimper. The wire that is fed out via the wire guide is cut and the insulation covering thereof is stripped from the wire by the cutting and stripping unit, after which the stripped end of the wire is transported to the terminal crimper, at which a terminal is crimped thereonto. This aspect of the present invention has a clamping mechanism which grabs one end of the wire after it returns to the cutting and stripping unit. This clamping mechanism is made up of a first support that serves also to position the wire, an upper clamp provided on the first support, a second support, which is provided so as to be movable upward and downward with respect to the first support, a lower clamp that is provided on the second support, and drive source that has a cam follower, which engages cams provided on each of the supports. The effect of the movement of the cam follower by the drive source is to bring together or separate the upper and lower clamps, via the supports and cams.

In the above-described automatic wire cutting and terminating apparatus, because the first support provided on the clamping mechanism serves also as a stopper to position the wire, simultaneously with the return of the wire guide of the wire transporter from the crimper to the cutting and stripping unit, the first end of the wire is securely grabbed between the supper and lower clamps before the shaking of the first end of the wire settles. By doing this, there is maximum prevention of bad product and stoppage of the apparatus, while and improvement is had in the production speed.

According to the embodiment described, there is provided an automatic wire cutting and terminating apparatus comprising a wire cutter, a cutting and stripping unit, a terminal crimper, a wire transporter for transporting a wire to the wire cutter and to the terminal crimper, the wire transporter comprising a wire guide for guiding the wire in a wire feeding direction, and a clamping mechanism which grasps one end of the wire, which has been fed out from the wire guide, cut and stripped of insulation by the cutting and stripping unit, and has been transported to the terminal crimper and terminated thereby with a crimp-on terminal by the terminal crimper, and then returned to the cutting and stripping unit, the clamping mechanism comprising a first support that serves to position the wire, an upper clamp that is provided on the first support, a second support that is provided so as to freely slide up and down with respect to the first support, a lower clamp provided on the second support, and a drive source comprising a cam follower that engages with cams that are provided on each of the first and second supports, wherein movement of the cam follower causes upper and lower cams, via the supports and cams, to move away from each other and toward each other.

In other words, in an automatic wire cutting and terminating apparatus according to the first aspect of the present invention, a wire guide that guides a wire in the wire feeding direction is provided in a wire transporter that transports a wire to a cutting and stripping unit and to a terminal crimper. The wire that is fed out via the wire guide is cut and the insulation covering thereof is stripped from the wire by the cutting and stripping unit, after which the stripped end of the wire is transported to the terminal crimper, at which a terminal is crimped thereonto. This aspect of the present invention has a clamping mechanism which grabs one end of the wire after it returns to the cutting and stripping unit. This clamping mechanism is made up of a first support that serves also to position the wire, and upper clamp provided on the first support, a second support, which is provided so as to be movable upward and downward with respect to the first support, a lower clamp that is provided on the second support, and drive source that has a cam follower, which engages cams provided on each of the supports. The effect of the movement of the cam follower by the drive source is to bring together or separate the upper and lower clamps, via the supports and cams.

Because the first support provided on the clamping mechanism serves also as a stopper to position the wire, simultaneously with the return of the wire guide of the wire transporter from the crimper to the cutting and stripping unit, the first end of the wire is securely grabbed between the upper and lower clamps before the shaking of the first end of the wire settles. By doing this, there is maximum prevention of bad product and stoppage of the apparatus, while an improvement is had in the production speed.

Moreover, according to the embodiment, inclined grove-hole shaped cams, which feature two oppositely directed inclinations, are used as the cams, and a bearing is used as the cam follower to engage with these cams.

Because inclined cams are used and a bearing is used as a cam follower, it is possible to achieve a compact clamping mechanism with only a small amount of variation in clamping force.

Further, in the embodiment, a pair of vertically elongated holes is provided in each of the two supports, a bearing being introduced into each pair of vertically elongated holes, so that each of the supports can be slid freely upward and downward.

Therefore, by introducing a bearing into the pair of vertically elongated holes of each of the upper and lower clamps, the upward and downward sliding of the supports is performed smoothly with little loss of drive power from the drive source, so that the wire is smoothly grabbed by the upper and lower clamps.

While preferred embodiments of the present invention have been described using specific terms, such description is for illustrative purposes, and it is to be understood that changes and variations may be made without departing from the spirit of scope of the following claims.

What is claimed is:

1. An automatic wire cutting and terminating apparatus comprising:

a first terminating section for crimping a terminal on a stripped end of a length of insulated electric wire set in a first termination position;

a wire transporter for transporting the length of insulated electric wire with the terminal crimped thereon from the first termination position in a first direction to a second termination position;

a second terminating section for terminating another end of the length of insulated electric wire received at the second termination position; and a clamp mechanism for clamping part of the length of insulated electric wire at the second termination position, the clamp mechanism comprising a stopper for impeding a first component of a motion of the insulated electric wire, the first component being parallel to the first direction, and a pair of clamping members having a concave shape to impede the first component and a second component of the motion of the insulated wire, the second component being perpendicular to the first direction, during movement of the clamping members toward each other, the pair of clamping members being movable relative to each other in a second direction crossing the first direction for positioning the part of the length of insulated electric wire, the pair of clamping members having cam grooves extending in directions each respectively crossing the first and second directions and crossing each other.

2. The apparatus of claim 1, wherein the pair of clamping members have cam grooves each respectively extending in the second direction.

3. The automatic wire cutting and terminating apparatus of claim 1 wherein the clamping members have a V-shape.

* * * * *

UNITED STATES PATENT AND TRADEMARK OFFICE

CERTIFICATE OF CORRECTION

PATENT NO. : 6,279,215 B1 
DATED : August 28, 2001
INVENTOR(S) : Yoshiaki Nomoto It is certified that error appears in the above-identified patent and that said Letters Patent is hereby corrected as shown below:

Title page,
Item [74], *Attorney, Agent, or Firm*, "Garret" should read -- Garrett --.
Item [57], ABSTRACT,
Line 9, before "drive source", insert -- a --.
Line 14, after "(63c)", insert -- and (65c) --.

Signed and Sealed this

Fifteenth Day of October, 2002

*Attest:*

JAMES E. ROGAN

*Attesting Officer* *Director of the United States Patent and Trademark Office*